United States Patent
Mattela et al.

(10) Patent No.: US 11,129,098 B2
(45) Date of Patent: Sep. 21, 2021

(54) MULTIPLEXED SIGNAL PROCESSING SYSTEM FOR BLUETOOTH AND WLAN TRANSCEIVER

(71) Applicant: Silicon Laboratories Inc., Austin, TX (US)

(72) Inventors: Venkat Mattela, San Jose, CA (US); Partha Sarathy Murali, Sunnyvale, CA (US); Ajay Mantha, Hyderabad (IN)

(73) Assignee: Silicon Laboratories Inc., Austin, TX (US)

( * ) Notice: Subject to any disclaimer, the term of this patent is extended or adjusted under 35 U.S.C. 154(b) by 82 days.

(21) Appl. No.: 16/599,872

(22) Filed: Oct. 11, 2019

(65) Prior Publication Data

US 2020/0137684 A1 Apr. 30, 2020

Related U.S. Application Data

(60) Provisional application No. 62/751,428, filed on Oct. 26, 2018.

(51) Int. Cl.
| | |
|---|---|
| *H04W 4/80* | (2018.01) |
| *H04W 52/02* | (2009.01) |
| *H04B 1/44* | (2006.01) |
| *H04B 1/00* | (2006.01) |
| *H04L 27/34* | (2006.01) |
| *H04L 25/03* | (2006.01) |
| *H04L 12/28* | (2006.01) |
| *H04W 84/12* | (2009.01) |
| *H04W 88/06* | (2009.01) |

(52) U.S. Cl.
CPC ...... *H04W 52/0225* (2013.01); *H04B 1/0028* (2013.01); *H04B 1/44* (2013.01); *H04L 25/03828* (2013.01); *H04L 27/34* (2013.01); *H04W 4/80* (2018.02); *H04B 1/006* (2013.01); *H04W 84/12* (2013.01); *H04W 88/06* (2013.01)

(58) Field of Classification Search
CPC ...................................................... H04L 12/28
USPC ......................................................... 370/329
See application file for complete search history.

(56) References Cited

U.S. PATENT DOCUMENTS

| | | | |
|---|---|---|---|
| 2010/0166123 A1* | 7/2010 | Pellon | H03B 28/00 375/344 |
| 2020/0091608 A1* | 3/2020 | Alpman | H04B 7/0639 |

* cited by examiner

*Primary Examiner* — Dang T Ton
(74) *Attorney, Agent, or Firm* — File-EE-Patents.com; Jay A. Chesavage

(57) ABSTRACT

A transmit/receive signal processor for Wireless Local Area Network (WLAN) and Bluetooth has selectable signal processing elements for mixers, Intermediate Frequency (IF) filters, transmit power amplifiers, and clock sources which are suitable for either Bluetooth or WLAN signal processing. The operating mode of the signal processor is selected to be one of Wireless High Performance, Wireless Low Power, Bluetooth High Performance or Bluetooth Low power, and the signal processing modules are selected to provide performance or power requirements using selected modules.

15 Claims, 2 Drawing Sheets

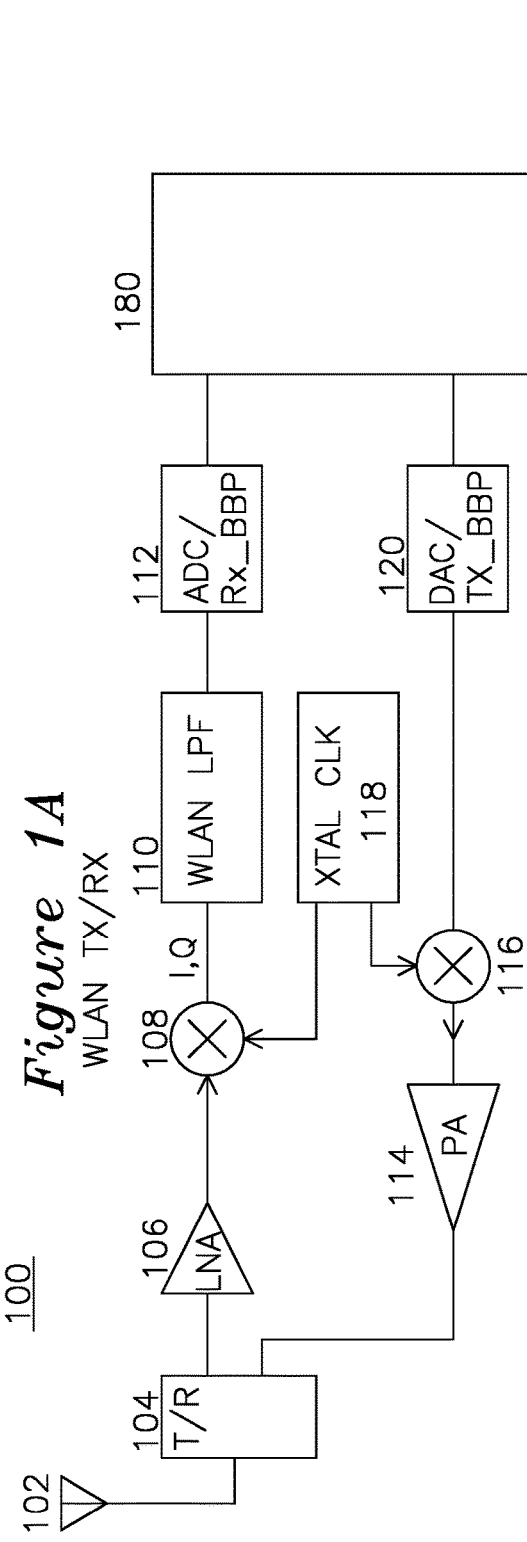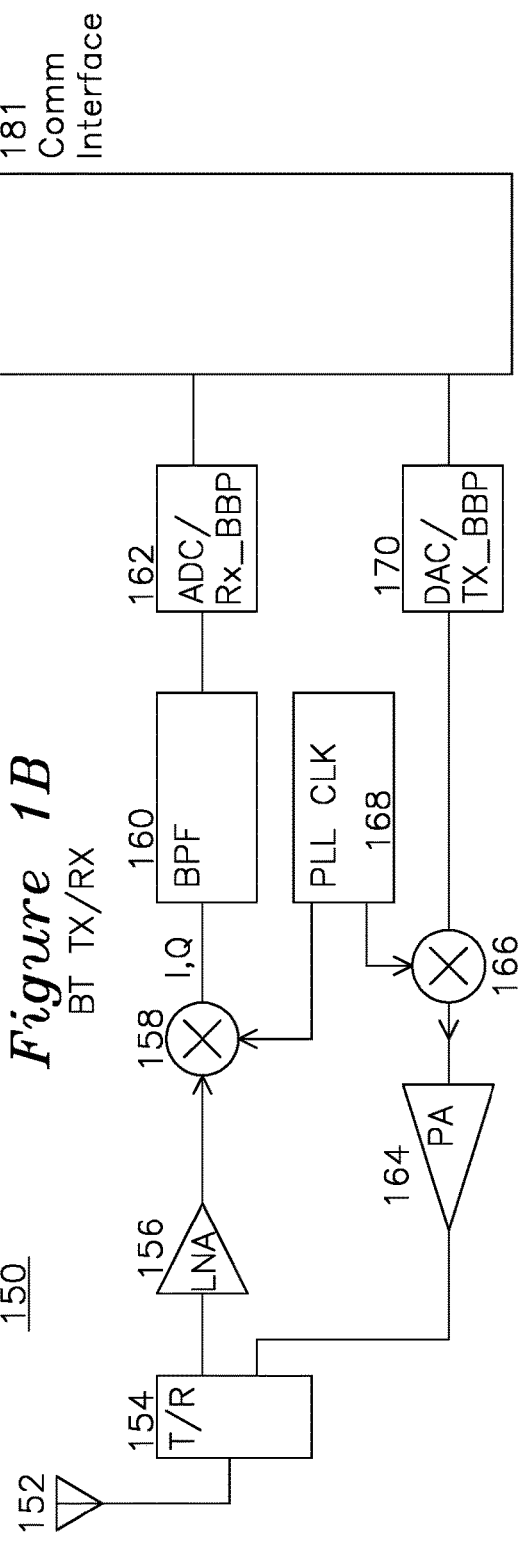

MULTIPLEXED SIGNAL PROCESSING SYSTEM FOR BLUETOOTH AND WLAN TRANSCEIVER

FIELD OF THE INVENTION

The present invention relates to an apparatus and method for transmit and receive signal processing. In particular, the invention relates to a multiplexed processing system for a combined Bluetooth and Wireless Local Area Network (WLAN) physical layer transceiver.

BACKGROUND OF THE INVENTION

Signal processing for WLAN operative using any of the IEEE 802.11 protocols, and Bluetooth operative under the standards described in www.Bluetooth.org, provide packets typically involves separate signal processing chains for each signal processing path, since the modulation and demodulation methods for each are quite different. A typical Bluetooth receive signal processing chain has more relaxed signal processing requirements and lower power consumption than the companion WLAN signal processing elements which perform similar functions.

There is a challenge in meeting low power consumption requirements for WLAN 2.4 GHz for Internet of Things (IoT) while retaining high performance and throughput when needed. For example, 2.4 GHz WLAN receivers spend a significant amount of time in listen mode during beacon scan, roaming, and beacon frame wakeups using the power saving modes of 802.11 series of WLAN protocols. Additionally, many IoT applications which operate on small portable WLAN devices are only transmitting minimal amounts of data, such as sensor data or voice data. As these are small data packets, there is less advantage of using higher data-rates (64-QAM, 256-QAM or 1024-QAM modulation modes) compared to lower data-rates (11b or BPSK/QPSK/16-QAM). It is therefore desirable to reduce the power consumption dynamically in these modes of operation.

Conversely, Bluetooth signal processing is typically performed using inexpensive components with reduced capabilities compared to WLAN, where the signal processing requirements are more stringent because of the higher information density of each WLAN symbol. As the information density of the constellation increases, the signal processing requirements also increase. In a single quadrature baseband symbol, a 'constellation' of energy levels is present, each constellation comprising multi-valued amplitude and phase and having a corresponding constellation density. A low density constellation may be any of: a WLAN Barker Code binary phase shift keying (BPSK) with two values per symbol, QPSK (Quadrature Phase Shift Keying) using four values per symbol, or 16-QAM (Quadrature Amplitude Modulation) using a 4×4 constellation of phase/amplitude values. A high density constellation may be a 64-QAM (having an 8×8 constellation of phase/amplitude signals) or greater. These are example modulations for WLAN in increasing constellation density.

For the Bluetooth protocol, the frequency channels are spaced 1 MHz apart, starting at 2,402 MHz and ending at 2,480 MHz. This can be represented using channel index n where the frequency of a particular channel is 2401+n, where integer n varies from 1 to 79. Bluetooth uses frequency hopping with phase shift keying. Bluetooth Modulation types include Basic Rate using Gaussian Phase Shift Keying which provides 1 Mbps, Extended Data Rate (EDR) using Differential Quadrature Phase Shift Keying (DQPSK) with 2 Mbps or 8DPSK providing 3 Mbps respective data rates.

Bluetooth also has a "low energy" mode (BLE) for reduced power consumption and a "long range" (BTLR) mode for long link distances, each with separate power consumption requirements.

Because of these different performance requirements and possibility of simultaneous operation, prior art Bluetooth receivers and WLAN receivers are separate fixed function devices in the prior art. For use in a shared signal processing system, it is desirable to dynamically enable a lower power (and lower performance) receiver for Bluetooth, and to enable a higher performance receiver with greater dynamic range, lower noise figure, and greater dynamic range providing better coverage distance at the expense of power consumption for use with WLAN, the higher performance receiver thereby having the ability to demodulate high density constellation symbols, particularly when the receiver is in the fringe of error-free operating range or is generating receive packet errors or is experiencing a low Received Signal Strength Indication (RSSI). It is desired to maintain this higher performance capability while retaining ultra-low power consumption for normal BILE mode of operation.

OBJECTS OF THE INVENTION

A first object of the invention is a wireless receiver for reception of a first wireless protocol such as WLAN having a high data rate and a second wireless protocol such as Bluetooth having a comparatively lower data rate, the wireless signal processor having, in sequence, a low noise amplifier, a dual-function mixer, a dual function IF filter, and an analog to digital converter and baseband processor, the dual-function mixer having exclusively operative a low noise balanced mixer enabled in a high performance mode or a single-ended mixer enabled in a low power mode, the dual function IF filter having exclusively available a zero IF filter with selective filter skirts and a low IF filter with less selective filter skirts and lower power consumption, the receiver also having a high performance baseband filter and a power saving baseband filter, such that for comparatively high data rate communications, the dual function mixer selects the balanced mixer and the dual function IF filter selects the zero IF filter, and for comparatively low data rate communications, the dual function mixer selecting the single ended mixer and the dual function IF filter selecting the low IF filter.

A second object of the invention is a clock source and a signal processing transceiver having an accurate mode of operation for reception of comparatively high density constellation symbols and a low power mode of operation for reception of low density constellation symbols, the accurate mode of operation utilizing a low phase noise clock source drawing comparatively greater power than a low power mode drawing comparatively less power.

A third object of the invention is a transmitter signal processor having a low power mode of communications for low density constellation symbols, and having a high performance mode of communication for comparatively high density constellation symbols, the high performance mode utilizing a low phase noise clock source consuming more power than a comparatively high phase noise clock source consuming less power, the transmitter signal processor having a selectable power amplifier which is enabled only when operative in a high transmit power mode of communications and not enabled during a low transmit power mode of communications.

A fourth object of the invention is a clock source and a receiver, the clock source and receiver having a high performance mode of operation for high constellation density symbols and a low power mode of operation for low constellation density symbols, the clock source provided to a low phase noise balanced mixer during a high performance mode of operation and the low power mode of operation clock source being applied to a single-ended mixer for low constellation density symbols with power removed from both the balanced mixer and high accuracy clock source during a power savings mode of operation.

SUMMARY OF THE INVENTION

Flexible RF signal processing for transmit and receive functions is provided in a manner which is suitable for integration into a system on a chip (SOC), the RF signal processing including a low noise amplifier (LNA), mixer, and phase lock loop (PLL) clock generators for Bluetooth and WLAN signal processing. Ordinarily each of these would be separate functions for Bluetooth and WLAN, where Bluetooth signal processing typically consumes less power and has less stringent signal processing requirements than the associated WLAN signal processing. In the present invention, the Bluetooth signal processing functions of Bluetooth LNA, Bluetooth Mixer, Bluetooth intermediate frequency (IF) filter and Bluetooth PLL output are multiplexed to a WLAN Filter and WLAN Programmable Gain Amplifier (PGA) to provide certain low power wireless modes for WLAN using the lower power consumption of the associated Bluetooth signal processing element. In a similar manner, the WLAN signal processing functions of WLAN LNA, WLAN Mixer, and WLAN PLL output are multiplexed to the Bluetooth intermediate frequency filter and Bluetooth programmable gain amplifier to selectively enable certain high-performance power wireless modes for Bluetooth.

BRIEF DESCRIPTION OF THE DRAWINGS

FIG. 1A shows a WLAN transceiver.
FIG. 1B shows a Bluetooth transceiver.

DETAILED DESCRIPTION OF THE INVENTION

Figure 2:
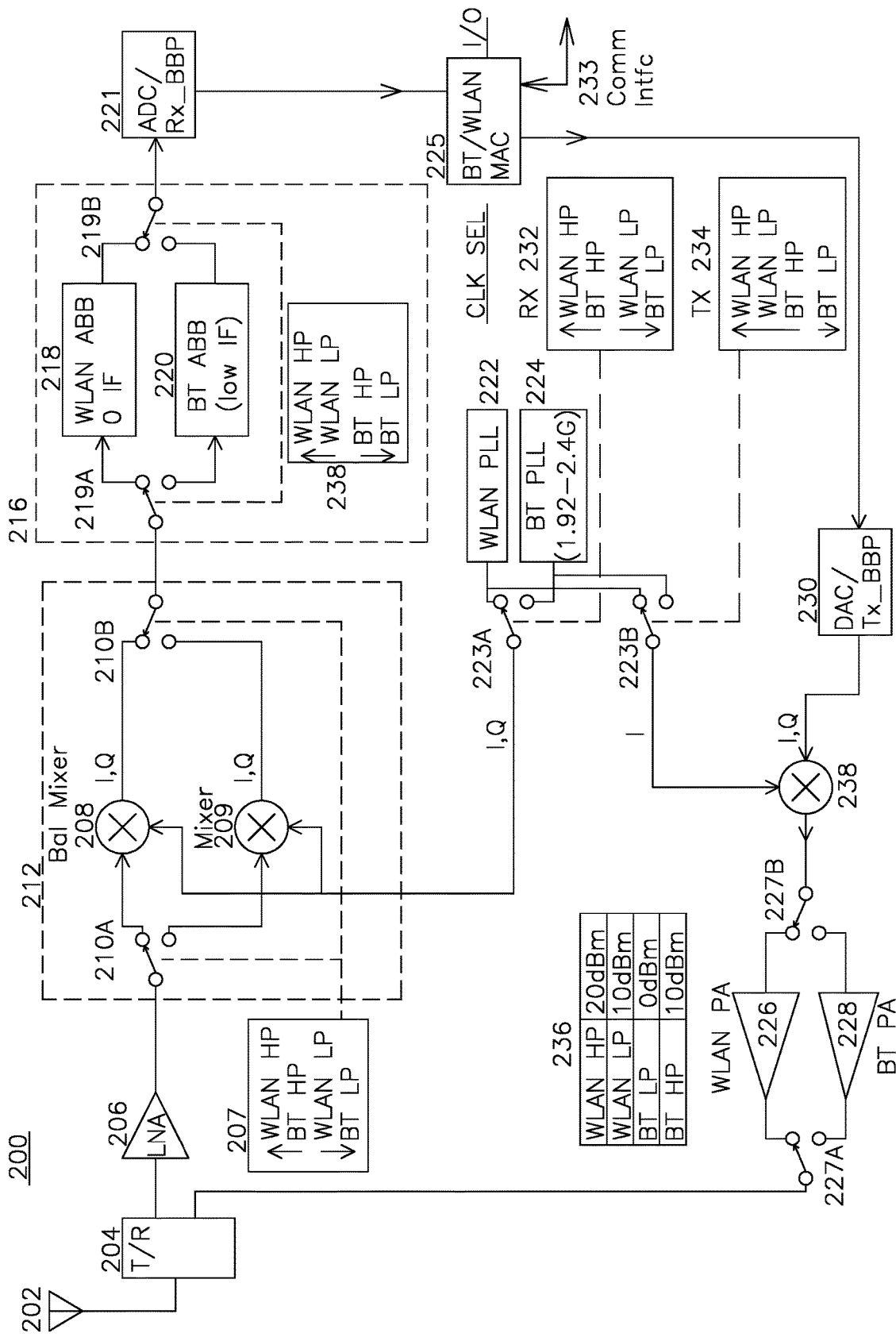
FIG. 2 shows a block diagram of a reconfigurable Bluetooth/WLAN transceiver.

FIG. 1A shows an example WLAN transceiver 100. Antenna 102 is coupled to a transmit/receive switch 104 for coupling receive signals to low noise amplifier 106 and transmit signals from power amplifier 114. Input signals are mixed 108 to baseband using a clock source 118, low pass filtered 110, and the analog baseband signal is digitized and processed with combined ADC and baseband processor 112 which demodulates the received symbols into a data stream which is formed into layer 2 packets by Media Access Controller MAC 180 to communications interface 181.

FIG. 1B shows an example Bluetooth transceiver 150 which similarly operates with antenna 152, transmit/receive switch 154, low noise amplifier 156, mixer 158, band pass filter 160, and analog/digital converter and baseband processor 162 which is operative to convert baseband Bluetooth frequency hopping patterns into data streams, similar to ADC/Baseband processor 112 forming data streams from received WLAN 802.11 packets. The Bluetooth transmit chain includes baseband processor and DAC 170, mixer 166 which modulates the baseband frequency hopping stream to an RF carrier frequency using modulation clock source 168, and power amplifier 164 which couples the modulated Bluetooth frequency hopping stream to transmit/receive switch 154. Each of the WLAN RX_BBP 112, WLAN TX_BBP 120, Bluetooth RX_BBP 162, and Tx_BBP 170 are coupled to respective Media Access Controller (MAC) 180, and MAC 180 has a data input/output interface 181 for managing data buffers (not shown) and control of the various functions.

The WLAN processing of FIG. 1A requires higher performance components than the Bluetooth processing of FIG. 1B. One reason for this is that the maximum data rate of Bluetooth is 3 Mbps, whereas the maximum data rate of WLAN is presently 600 Mbps and future protocols may provide higher data rates, requiring greater clock timing accuracy, greater mixer linearity and dynamic range, and faster sampling rates at the ADC. Accordingly, the clock source 118 for WLAN requires a low noise high Q crystal oscillator 118, and clock distribution which operates a comparatively high distribution frequency, such as 40 Mhz or 80 Mhz. In contrast, the clock source oscillator 168 of FIG. 1B may utilize a phase lock loop clock multiplier from a low power ring oscillator (RO) or other source with greater phase noise, but which also has advantageously lower power consumption compared to the crystal oscillator or resonator clock source 118 required for high data rate WLAN communications. The WLAN low pass filter 110 requires more complex filter with a larger number of poles, and greater accuracy and temporal stability to maintain phase coherence of the symbols which pass through this low pass filter 110, and additionally requires steeper filter skirts outside of the passband, which results in more stages of filter for selective bandwidth and higher power consumption than the comparatively simpler bandpass filter 160 of FIG. 1B. Additionally, Bluetooth power amplifier 164 may have a low power mode of operation for the BLE protocol (low power Bluetooth) and a high power mode of operation for BTLR protocol (Bluetooth long range).

FIG. 2 shows a combined Bluetooth/WLAN receiver which has low power consumption when in a Bluetooth mode, and higher power consumption and higher signal processing performance when the corresponding signal processing elements are used in a WLAN mode, thereby providing the benefit of low power consumption for Bluetooth and low constellation density WLAN, and high performance as required for low data error for WLAN using high density constellation modulation such as 8×8 or 16×16 modulation modes. A single antenna 202 has frequency and impedance matching characteristics suitable for Bluetooth or WLAN signals, alternatively, different antennas may be used. The transmit/receive (T/R) switch 204 directs receive signals to low noise amplifier 206, which amplifies the signals with selectable gain levels such as a low, medium, and high gain, each having approximately 20 db per step gain change, while adding minimal noise and directing the incoming signal to dual function mixer module 212, which has a high linearity balanced mixer 208 having required performance properties for WLAN signal processing, and also a less linear (higher −3b intercept for third order harmonics) power saving mixer 209 which advantageously draws less power but has less dynamic range and more harmonic distortion than balanced mixer 208. Input selector 210A and output selector 210B couple the respective mixer to input and output signals, and also provide isolation such that the associated unused mixer can be powered down. In one example of the invention, the balanced mixer 208 is used for high data rate WLAN symbols (such as 64-QAM and greater modulation constellation densities) or weak RSSI Bluetooth signals which may need better noise performance at the expense of power, and the low power mixer 209 is used for BLE Bluetooth signals as well as WLAN low data rate modulations (such as DPSK and QPSK). In one example of the invention, the mixer 208 receive processing chain has a noise figure of 5 dB in a high performance mode and mixer 209 receive processing has a noise figure of 9 dB in a low power mode.

The dual mode intermediate frequency (IF) module 216 consists of a zero intermediate frequency (ZIF) analog baseband filter (ABB) 218 suitable for WLAN processing, and also a low intermediate frequency analog baseband filter 220 suitable for Bluetooth signal processing, and input and output selectors 219A/219B which enable the isolation and power down of the non-selected IF amplifier 218 or 220, and selector 219B which couples the selected IF output to the analog to digital converter (ADC) and receive baseband processing 221. In one example of the invention, the WLAN low pass filter 218 is used for all WLAN data rates and modulation types, and the Bluetooth filter 220 is used for all Bluetooth data rates and modulation types. In another example of the invention, the WLAN filter 218 has a −3 dB bandwidth of 10 Mhz and has a filter skirt with −28 dB rejection at 20 Mhz (2× cutoff frequency) and −45 dB rejection at 30 Mhz (3× cutoff frequency), whereas the Bluetooth low IF filter 220 has a −3 dB bandwidth at 1 Mhz, and a filter skirt with only −18 dB at 2 Mhz (2× cutoff frequency) and −28 dB at 3 Mhz (3× cutoff frequency). In this example, the WLAN low pass filter has an associated current draw of 12 ma, whereas the Bluetooth low IF filter power consumption is only 700 uA.

The clock generation for WLAN and Bluetooth similarly have different requirements, the WLAN PLL 222 provides low phase noise and tight frequency control which may be provided by crystal oscillator or resonator performance at the expense of greater power consumption, whereas the Bluetooth PLL 224 draws less current but has greater phase noise and jitter while meeting the relaxed Bluetooth performance requirement. Clock selector 223A selects one of the clocks for delivery to the mixer module 210, and clock selector 223B independently selects a clock for delivery to the transmit mixer 208, or each source may be separately used for receive and transmit functions according to the performance requirements of each separate signal processing chain. Additionally, the unused clock source may be powered down and disabled, and powered back up a settling time interval before it is needed. In one example of the invention, the high performance WLAN crystal oscillator 222 current and clock distribution draw is 14.6 ma, whereas the Bluetooth ring oscillator 224 has a current draw of 1.5 ma.

The transmit chain includes a transmit baseband processor 230 which provides baseband digital symbols for Bluetooth or WLAN, which are converted to analog signals with a digital to analog converter (DAC) in combined DAC/Baseband processor function 230, and the analog baseband symbol stream is delivered to mixer 238, which up-converts to WLAN or Bluetooth modulation frequency using a carrier clock at the modulation frequency from clock source modules 222 or 224, only one of which is typically enabled according to the quality and type of transmit clock required. WLAN and Bluetooth power amplifiers 226 and 228 are similarly selected for WLAN or Bluetooth mode with selectors 227A and 227B, which couple the modulated RF through TR switch 204 to antenna 202. Power amplifiers 226 and 228 may have different gains such that BLE results in transmission of a low output power such as maximums of 0 dbm for BLE, +10 dBm for BTLR, and +20 dBm for WLAN modes. The characteristics for phase noise and stability (lower phase noise for a crystal oscillator or resonator with higher power consumption compared to a ring oscillator with greater phase noise and lower power consumption) may be selected 223A/B as required, so the WLAN mixer 238 may use a low phase noise PLL 222 for high constellation density WLAN 64-QAM modulation types as well as long range Bluetooth, and the lower power consumption but noisier PLL 224 for low constellation density WLAN (BPSK, QPSK, 16-QAM) as well as low energy Bluetooth (BLE) modulations. The center frequency of the clock sources 222 and 224 will be modified for BT vs WLAN transmit or receive frequency, as required. Example performance for WLAN clock source 222 is 40 Mhz with phase noise of −142 dBc/Hz for high performance mode of operation, or 16 Mhz with phase noise of −134 dBc/Hz for low power mode of operation.

In a first example of the invention, the signal processing selectors 210A/B, 219A/B, 223A/B, and 227A/B are operative in a high performance mode (upper selector position) during WLAN signal processing with high constellation density (such as 64-QAM, or 1024-QAM) or Bluetooth Long Reach (BTLR) protocols, and a power saving mode (lower selector position) during Bluetooth low energy (BLE) signal processing or low constellation density (WLAN BPSK and QPSK).

In a second example of the invention, the signal processing is adaptive for the particular type of signal being processed. In this example use, the signal processing is separated into these categories:

WLAN High Performance (WLAN_HP), WLAN Low Power (WLAN_LP), Bluetooth High Performance (BT_HP), and Bluetooth Low Power (BT_LP). Typically, Bluetooth Low-Energy receivers (Bluetooth LNA, Bluetooth Mixers, Bluetooth Oscillators, Bluetooth RF-PLLs, an Bluetooth Filters) are optimized for lowest power consumption compared to WLAN due to relaxed performance requirements (higher noise figure allowable for LNA 206, higher allowable phase noise in oscillator and RF-PLL and lower linearity and filter order (measured as out-of-band filter slope and relaxed filter requirements). The Bluetooth LE receiver filter cannot be used for WLAN as the Filter bandwidth for BT-LE is 2 MHz compared to 20 MHz for WLAN in 2.4 GHz band.

In one example configuration of the invention, the WLAN_HP, WLAN_LP, BT_HP, and BT_LP operating modes are further subdivided into the following transmitter/receiver configurations:

Wireless Lan High Performance (WLAN_HP):
Mode_1: WLAN 20 Mhz Receiver ADC sampling rate
Mode_2: WLAN 40 Mhz Receiver ADC sampling rate
Mode_3: ZB with low pass filter=ZIF
Mode_4: Bluetooth EDR mode with Zero Intermediate Frequency (ZIF)
Mode_5: Bluetooth Long Range (BTLR) with low pass filter=ZIF.
Mode_6: Bluetooth Low Energy (BLE) 2 Mbps data rate with low pass filter=ZIF.
Mode_7: Bluetooth Low Energy (BLE) with data rate 1 Mbps and low pass filter ZIF.
with:

Front_end: WLAN_RX mixer 208
ABB: WLAN Zero IF filter 218
PLL: WLAN clock 222
PA: WLAN amplifier 226
Tx_pwr: 20 dBm
Wireless LAN Low Power (WLAN_LP):
Mode_8: WLAN rates excluding 64-QAM or greater: BPSK, QPSK, 16-QAM.
with:
Front_end: BT RX mixer 209
ABB: WLAN Zero IF low pass filter 218
PLL:
   Receive clock: BT PLL 224
   Transmit clock: WLAN PLL 222
PA: WLAN amplifier 226
Tx_pwr: 10 dBm
Bluetooth Low Power (BT_LP):
Mode_9: Bluetooth Long Range (BTLR with Low IF 220)
Mode_10: Bluetooth Low Energy (BLE) data rate 2 Mbps with Low IF
Mode_11: Bluetooth Low Energy (BLE) or Bluetooth Long Range (BTLR) and data rate=1 Mbps using Low IF 220
with:
Front_end: BT RX mixer 209
ABB: BT low IF 220
PLL: BT clock source 224
PA: BT amplifier 228
Tx_pwr: 0 dBm
Bluetooth High Performance (BT_HP):
Mode_12: Bluetooth EDR (datarate=3 Mbps) with Low IF filter 220
Mode_13: Bluetooth ZB with Low IF filter 220
Mode_14: Bluetooth Long Range (BTLR) with Low IF filter 220
Mode_15: Bluetooth Low Energy (BLE) or Bluetooth Long Range (BTLR) with datarate=1 Mbps with Low IF filter 220
Mode_16: Bluetooth Low Energy (BLE) with data rate=2 Mbps and Low IF filter 220.
using:
Front_end: WLAN_RX mixer 208
ABB: BT_ZIF low pass filter 218
PLL: WLAN clock source 222
PA: WLAN amplifier 226
Tx_pwr: 10 dBm The example configurations for each of the selectors is shown in FIG. 2, table 207 relates to selectors 210A/B, table 238 relates to selectors 219A/B, table 236 relates to selectors 227A/B, table 232 relates to receive selector 223A and table 234 relates to transmit selector 223B.

The present examples are provided for illustrative purposes only and are not intended to limit the invention to only the embodiments shown. High speed and high frequency are understood to refer to the same characteristic, and low speed and low frequency are similarly understood to refer to the same characteristic. The use of claims terms such as "order of magnitude" is meant to include the range from 0.1× to 10× the nominal value, whereas "approximately" is understood to include the range of one half to two times the nominal value. The scope of the invention is limited only by the claims which follow.

We claim:

1. A wireless receiver operative for reception of a first wireless protocol having a high data rate and a second wireless protocol having a lower data rate, the wireless receiver comprising, in sequence:
a low noise amplifier;
a dual-function mixer module coupled to the low noise amplifier and having exclusively operative a low noise balanced mixer enabled in a high-performance mode or a single-ended mixer enabled in a power savings mode;
a dual function IF filter coupled to an output of the dual-function mixer and having exclusively operative a zero IF filter with selective filter skirts and a low IF filter with less selective filter skirts and lower power consumption than the zero IF filter;
an analog to digital converter and baseband processor coupled to an output of the dual-function mixer module for forming a data stream from either Bluetooth baseband signals or wireless local area network baseband signals;
such that when a packet with a high data rate payload is received, the dual function mixer module selects the balanced mixer and the dual function IF filter selects the zero IF filter, and for comparatively low data rate communications, the dual function mixer module selects the single ended mixer and the dual function IF filter selects the low IF filter.

2. The wireless receiver of claim 1 where said high data rate payload is a WLAN packet with 64-QAM or greater constellation density modulation.

3. The wireless receiver of claim 1 where said comparatively low data rate communications includes at least one of WLAN BPSK, WLAN QPSK, or Bluetooth low energy (BLE) protocols.

4. The wireless receiver of claim 1 where said balanced mixer is enabled for WLAN 64-QAM or greater modulation, or a Bluetooth protocol which is unsuccessfully demodulated by the baseband processor using the single ended mixer.

5. The wireless receiver of claim 1 where the balanced mixer is selected for WLAN high performance modes and Bluetooth high performance modes, and the single ended mixer is selected for WLAN low performance modes and Bluetooth low performance modes.

6. The wireless receiver of claim 1 where the zero IF filter is selected for WLAN protocols and the low IF filter is selected for Bluetooth protocols.

7. The wireless receiver of claim 1 where a crystal oscillator or resonator is selected as a source for a WLAN protocol and a ring oscillator or RC oscillator is selected for a Bluetooth protocol.

8. The wireless receiver of claim 1 where the dual-function mixer module is coupled to a clock source, the clock source having an accurate mode of operation when the balanced mixer is selected and a low power mode of operation for reception when the single ended mixer is selected, the accurate mode of operation utilizing a low phase noise clock source drawing comparatively greater power than a low power mode drawing comparatively less power.

9. The wireless receiver of claim 8 where said clock source is a crystal oscillator or resonator source in said accurate mode of operation.

10. The wireless receiver of claim 8 where said clock source is a phase lock loop or ring oscillator in said lower power mode of operation.

11. A transmitter signal processor having a low power mode for transmission of low density constellation symbols and an accurate mode of transmission of high density constellation symbols drawing more power than the low power mode, the transmitter comprising:
- a dual Bluetooth and WLAN baseband signal processor for generating Bluetooth frequency hopping baseband modulation or WLAN baseband modulation as analog signals;
- a mixer coupled to analog signals, the mixer accepting a clock signal from a clock source having an accurate mode and a low power mode;
- a power amplifier having discretely selectable gain;
- the clock source accurate mode coupling a low phase noise crystal oscillator clock source to the mixer, and the low power mode coupling a ring oscillator or RC oscillator and phase lock loop frequency multiplier to the mixer, the ring oscillator or RC oscillator clock source having greater phase noise than the low phase noise crystal oscillator clock source;
- the low phase noise crystal oscillator clock source powered down when the ring oscillator or RC oscillator is the clock source coupled to the mixer.

12. The transmitter signal process of claim 11 where the transmitter signal processor is operative to utilize the accurate mode for high density constellation symbols and operative to use the lower power mode for low density constellation symbols.

13. The transmit signal processor of claim 11 where said power amplifier discretely selectable gain is more than 10db when operative in a long-range mode of communications and not enabled at other times.

14. The transmit signal processor of claim 11 where said power amplifier is enabled in a Bluetooth Long Range mode or a WLAN mode, and is not enabled at other times.

15. A clock source operative with a receiver having exclusively a balanced mixer mode and a single ended mixer mode, the clock source having exclusively available a comparatively low phase noise mode with a crystal oscillator source and also a low power mode with a ring oscillator source or RC oscillator source having comparatively lower power consumption and comparatively higher phase noise than the crystal oscillator source;
- the receiver operative in a first high accuracy mode of operation for receiving high constellation density symbols by enabling the balanced mixer mode and low phase noise mode, and a second low power mode of operation for low constellation density symbols by enabling the single ended mixer and the low power mode clock source.

* * * * *